United States Patent [19]

Moon et al.

[11] Patent Number: 5,980,822
[45] Date of Patent: Nov. 9, 1999

[54] LEADLESS ALLOY FOR SOLDERING

[75] Inventors: Young-Zoon Moon; Jae-Ho Han; Chul-Woo Park, all of Suwon, Rep. of Korea

[73] Assignee: Samsung Electronics Co., Ltd., Rep. of Korea

[21] Appl. No.: 09/009,309

[22] Filed: Jan. 20, 1998

[30] Foreign Application Priority Data

Feb. 15, 1997 [KR] Rep. of Korea .......................... 97-4579

[51] Int. Cl.$^6$ ............................ B23K 35/26; C22C 13/02
[52] U.S. Cl. ............................................. 420/561; 420/562
[58] Field of Search ...................................... 420/561, 562

[56] References Cited

FOREIGN PATENT DOCUMENTS 61-273296  12/1986  Japan .
10137971   5/1998   Japan .

*Primary Examiner*—Sikyin Ip
*Attorney, Agent, or Firm*—Burns, Doane, Swecker & Mathis LLP

[57] ABSTRACT

A leadless alloy for soldering containing 0.1 to 5.0% bismuth, 0.1 to 5.0% silver, 0.1 to 3.0% antimony, 0.1 to 5.5% copper, 0.001 to 0.01% phosphorus, 0.01 to 0.1% germanium and 81.4 to 99.6% tin by weight.

1 Claim, No Drawings

LEADLESS ALLOY FOR SOLDERING

BACKGROUND OF THE INVENTION

The present invention relates to leadless alloy for soldering, which more specifically prevents damage of the human body such as lead poisoning, etc, in the soldering process and also reduces the amount of production of metal-oxide substance. This results in a drop in the poor connection ratio when this alloy is used for connecting the electric circuit board, at the same time, a drastically reduced amount of the waste lead.

DESCRIPTION OF THE PRIOR ART

Generally, soldering is a method used to connect metals together by melting solder and putting it between the metals. In this field, materials of the solder are used, of which a melting point is lower than that of the metals that should be joined, and there are two types of the solder: one is soft solder of which the melting point is below 327° C., the other is hard solder of which the melting point is above 450° C.

The soft solder can be easily used for the soldering due to the comparably low melting point, and however it has a poor mechanical strength. For the reason, it has been popular applied to a portion where a large quantity of strength dose not act, thin boards or narrow lines made of steel, brass, copper, nickel, etc, and products made of tinned ion sheet, galvanized iron sheet, copper alloy and others.

The soft solder is produced as the shapes of powder, band, wire, etc, and there are brass solder including Cu, Zn and Pb as primary components and silver solder having good fluidity due to the addition of silver.

The soldering process using such soft lead is firstly to put hydrochloric acid on a portion to be connected. After also putting the hydrochloric acid on the edge of a fully heated soldering iron, the soldering is practically carried out by mean of molten lead. Differently from this, in the soldering using the hard solder, the hard solder is heated by a torch lamp or gas.

However, these typical solders contain about 10–75% lead as a primary component. Accordingly, if toxic gas leaks, generated from the melting step of such lead cognation solder, it may bring any fatal accident.

SUMMARY OF THE INVENTION

In view of the above, the present invention is proposed to remove a deleterious effect on the human body caused by lead containing solder.

It is an object of the present invention is to provide a leadless solder for soldering which shows proper characteristics in melting point, soldering stress and life of creep, despite of containing no lead, prevents damage of the human body such as lead poisoning, etc, in the soldering process. and also drops the poor connection ratio when this alloy is used for connecting the electric circuit board by reducing the amount of production of metal-oxide substance.

To achieve the above object of the invention, the alloy is typically comprised of 0.1–5.0% Bi, 0.1–5.0% Ag, 0.1–3.0% Sb, 0.1–5.5% Cu, 0.001–0.01% P, 0.01–0.1% Ge by weight and Sn as the remaining weight (i.e., 81.4–99.6% Sn by weight).

DETAILED DESCRIPTION OF THE PREFERRED EMBODIMENTS

Hereinafter, the present invention is described below.

This alloy includes no lead which is one of the major component of the solder together with Sn, and however it brings an enhanced soldering efficiency.

In addition, it is desirably used for connecting the electronic components such as IC, chip, etc to printed circuit board (PCB) or LAND or PAD. The progress of such processes is relied on chemical reaction and metallurgical reaction, and intermetallic compound is produced between the molten solder and the metal material which should be connected. That is, in the typical soldering, Sn which is one of the major component of the solder together with Pb reacts to Cu which is a component of the LAND, producing the intermetallic compounds such as $Cu_3Sn$ or $Cu_6Sn_5$ which enable the connecting reaction between the solder and the LAND. In the case, Pb helps the good connection between Cu and Sn, and it promotes the formation of binary composition to decrease the reaction temperature of the both metals and the melting temperature thereof.

As illustrated above, the melting point of the solder increases if the Pb is removed from the solder which is primarily formed of Sn and Pb, and, if the Sn is only included without Pb, the strength increases while the shock strength decreases as the Sn is changed from $\beta$ to $\alpha$.

Accordingly, in the invention, Bi occupies 0.1–5.0% by weight in the total composition to drop the solidus line corresponding the melting point of the solder.

However, Sb is dispersed into the Sn to be 0.1–3.0% by weight in the invention since Bi is a material having a characteristic of brittleness so that the $\beta \rightarrow \alpha$ transformation can be prevented when Sn is melted and the brittleness characteristic of the Sn—Bi alloy is also improved. Moreover, there is little deteriorating effect according to the addition of Sb within a certain limit because Sb and Bi are completely mixed.

To obtain an enhanced connection strength, about 0.1–5.0% Ag is added to the invention. Because Ag has a small atomic radius, it allows the solder to be rapidly dispersed into the metals during the solder melting process, thereby increasing the connection strength between the solder and the metals.

The addition of the copper enhances the connection strength because the copper is equal component to the metal, and a desirable amount of Cu is about 0.1–5.5% by weight for the total composition.

On the other hand, because the invention includes a large amount of Sn instead of Pb, the metal-oxide substance may increase. Accordingly, in this invention, 0.01–0.1% Ge and 0.001–0.01% P by weight are added. That is why such addition can prevent the formation of the metal-oxide substance, improving a characteristic of the thermal fatigue so much that the connection part according to the soldering endure a termal deformation or a stress, controlling grain coarsening, reducing the formation of crack at the portion of connection, and ensuring a reliability. Moreover, it can improve the result of the soldering, and reduce fundamentally the source of poor soldering such as, bridge, cool solder and imperfect solder.

The present invention is described below with reference to the embodiments below.

(Embodiment 1)

Leadless Alloy for soldering is comprised of 6.0% Bi, 1.5% Ag, 0.4% Sb, 0.1% Cu, 0.03% P, 0.003% Ge by weight, and Sn as the remaining.

(Embodiment 2)

Leadless Alloy for soldering is comprised of 7.0% Bi, 2.0% Ag, 0.8% Sb, 0.5% Cu, 0.02% P, 0.004% Ge by weight, and Sn as the remaining.

(Embodiment 3)

Leadless Alloy for soldering is comprised of 8.5% Bi, 2.5% Ag, 1.0% Sb, 1.0% Cu, 0.04% P, 0.008% Ge by weight, and Sn as the remaining.

(Embodiment 4)

Leadless Alloy for soldering is comprised of 6.0% Bi, 1.5% Ag, 0.4% Sb, 0.1% Cu, 0.01% P, 0.001% Ge by weight, and Sn as the remaining.

(Embodiment 5)

Leadless Alloy for soldering is comprised of 7.0% Bi, 2.0% Ag, 0.8% Sb, 0.5% Cu, 0.05% P, 0.005% Ge by weight, and Sn as the remaining.

(Embodiment 6)

Leadless Alloy for soldering is comprised of 8.5% Bi, 2.5% Ag, 1.0% Sb, 1.0% Cu, 0.1% P, 0.01% Ge by weight, and Sn as the remaining.

(Comparison)

Solder is comprised of 63% Sn and 37% Pb by weight.

(Experiment)

Table 1 lists the melting point, amount of oxidation, soldering stress and life of the creep of various leadless alloy resulted from the above mentioned embodiments 1–6 and comparison.

TABLE 1

| | melting point | | amount of oxidation (g) | strength of soldering (kgf) | life of creep (hr) |
|---|---|---|---|---|---|
| | solidus line | | | | |
| Embodiment 1 | 205 | | 215 | 61 | 12.9 | 11.4 |
| Embodiment 2 | 200 | | 214 | 57 | 11.3 | 11.6 |
| Embodiment 3 | 198 | | 215 | 55 | 11.3 | 12.3 |

TABLE 1-continued

| | melting point | | amount of oxidation (g) | strength of soldering (kgf) | life of creep (hr) |
|---|---|---|---|---|---|
| | solidus line | | | | |
| Embodiment 4 | 205 | 215 | 51 | 11.9 | 11.2 |
| Embodiment 5 | 200 | 215 | 45 | 11.8 | 11.5 |
| Embodiment 6 | 198 | 215 | 36 | 11.6 | 11.9 |
| Comparison | 183 | 183 | 45 | 8.2 | 1.3 |

As shown in the Table 1, it is noted that this leadless alloy is prominent to the typical solder in the melting point, soldering strength, life of the creep. For the amount of oxidation, the embodiments 1 to 4 shows good result and the embodiment 5 shows equal result.

As described above, this leadless alloy for soldering includes Sn as a primary component, together with Cu, Ag, Bi, Sb, P and Ge, and it shows proper characteristics in melting point, amount of oxidation, soldering stress and life of creep, despite of containing no lead. Another possible advantage of this alloy is to minimize a deleterious effect on the human body, for example, by toxic gas which can be generated in the lead containing soldering process.

Although the present invention has been described in detail with reference to the preferred embodiments thereof, those skilled in the art will appreciate that various substitutions and modifications can be made thereto without departing from the spirit and scope of the invention as set forth in the appended claims.

What is claimed is:

1. A leadless alloy for soldering consisting of: 0.1–5.0% Bi, 0.1–5.0% Ag, 0.1–3.0% Sb, 0.1–5.5% Cu, 0.001 to 0.01% P, 0.01 to 0.1% Ge and 81.4–99.6% Sn by weight.

* * * * *